US007617986B2

(12) United States Patent
Boria-Weiss et al.

(10) Patent No.: US 7,617,986 B2
(45) Date of Patent: Nov. 17, 2009

(54) LAMINATE SECURITY FEATURE

(75) Inventors: Carla Kaye Boria-Weiss, Minnetonka, MN (US); Mary Lee Olson, Greenfield, MN (US); Jose Carlos Pereira Pires, Jr., Miami, FL (US); Ismael Pablo Dykman, Miami Lakes, FL (US); James Runcie, Basingstoke (GB); Stuart Neil Crocker, Eden Praire, MN (US)

(73) Assignee: DataCard Corporation, Minnetonka, MN (US)

( * ) Notice: Subject to any disclaimer, the term of this patent is extended or adjusted under 35 U.S.C. 154(b) by 100 days.

(21) Appl. No.: 11/621,648

(22) Filed: Jan. 10, 2007

(65) Prior Publication Data

US 2008/0164322 A1 Jul. 10, 2008

(51) Int. Cl.
*G06K 19/02* (2006.01)

(52) U.S. Cl. ........................ 235/488; 235/375; 235/380; 235/487; 235/494

(58) Field of Classification Search ................. 235/487, 235/484, 375, 380, 488, 494; 283/67
See application file for complete search history.

(56) References Cited

U.S. PATENT DOCUMENTS 3,636,318 A 1/1972 Lindstrom et al.
4,476,468 A 10/1984 Goldman
4,520,055 A 5/1985 Jeter
4,745,267 A 5/1988 Davis et al.
4,940,690 A * 7/1990 Skees ......................... 503/206
5,319,475 A 6/1994 Kay et al.
5,336,871 A 8/1994 Colgate, Jr.
5,380,044 A * 1/1995 Aitkens et al. .............. 156/277
5,442,433 A 8/1995 Hoshino et al.
RE35,599 E 9/1997 Pease
5,757,521 A 5/1998 Walters et al.
5,900,951 A * 5/1999 Tsai ........................... 358/497
5,900,954 A 5/1999 Katz et al.
6,007,660 A * 12/1999 Forkert ....................... 156/256
6,103,327 A 8/2000 Bragole et al.

(Continued)

FOREIGN PATENT DOCUMENTS

GB 2383758 A * 7/2003

OTHER PUBLICATIONS

Written Opinion of the International Searching Authority of International Application No. PCT/US2007/088811.

*Primary Examiner*—Thien M. Le
*Assistant Examiner*—Tuyen K Vo
(74) *Attorney, Agent, or Firm*—Hamre, Schumann, Mueller & Larson, P.C.

(57) ABSTRACT

Laminates are provided which are to be laminated onto identification documents, for example cards or passports, to provide protection for the document. Each laminate is provided with a unique code. The codes on the laminates can be read and stored with cardholder data. After issuance, the code can be read and then the stored codes accessed to determine whether or not the code, and the associated card, is correct. The codes can also be provided to the user of the laminate roll to be stored in a database accessible by the personalization equipment. The equipment can then read each code, and check the code against the database to determine whether the code is proper. If the code is not proper, the equipment operator can be alerted to that fact, and suitable action taken.

19 Claims, 1 Drawing Sheet

U.S. PATENT DOCUMENTS

| | | | | |
|---|---|---|---|---|
| 6,263,796 | B1 * | 7/2001 | Jordan | 101/486 |
| 6,769,718 | B1 * | 8/2004 | Warther et al. | 283/61 |
| 6,817,530 | B2 * | 11/2004 | Labrec et al. | 235/487 |
| 6,929,413 | B2 | 8/2005 | Schofield | |
| 7,028,896 | B2 | 4/2006 | Goldstein et al. | |
| 2004/0020992 | A1 * | 2/2004 | Lasch et al. | 235/487 |
| 2004/0101158 | A1 | 5/2004 | Butler | |
| 2004/0158724 | A1 | 8/2004 | Carr et al. | |

* cited by examiner

LAMINATE SECURITY FEATURE

FIELD

This disclosure relates to security measures involving identification documents, such as plastic and composite cards including identification cards, credit and debit cards, and the like, as well as passports. More particularly, this disclosure relates to improvements in security of identification documents during personalization and issuance of identification documents, as well as after the documents are issued.

BACKGROUND

Identification documents such as identification cards, credit and debit cards, and the like, and passports, are personalized with information concerning the intended holder of the identification document and then issued to the intended holder. Personalization and issuance are typically handled by government agencies, credit card companies, or entities authorized to handle the personalization and issuance process.

As part of the personalization and issuance process, the identification documents can undergo a number of personalization procedures, including printing, photoprinting, magnetic stripe and/or chip encoding, embossing, lamination of protective laminates, and other known procedures.

A number of security measures have been implemented in order to prevent fraudulent production of identification documents and theft of identification documents during personalization and issuance, as well as prevent fraudulent use of identification documents once issued. One such security measure is the use of serialized cards during the personalization process, and tracking of the serialized cards throughout the entire personalization and issuance process. Under this known security measure, if a non-sequential card is detected, that can indicate the possibility that a card(s) has been improperly removed.

However, further improvements to security measures to prevent fraudulent production of identification documents and theft of identification documents, as well as prevent fraudulent use of identification documents once issued, are needed.

SUMMARY

Improved security measures are described that help to deter the fraudulent production of identification documents and theft of identification documents, as well as prevent fraudulent use of identification documents once issued. The identification documents can be any identification documents in which it is desired to deter fraudulent production, theft and fraudulent use of such documents. Examples of identification documents include plastic and composite cards, for example identification cards, credit and debit cards, and the like, and passports.

In one embodiment, laminates are provided which are to be laminated onto personalized identification documents to provide protection for the document. Each laminate is provided with a readable, unique code. The codes can be formed by any type of indicia, for example a barcode, numbers, letters, symbols, etc., and combinations thereof. The code on each laminate can be overt (i.e. visible to the naked eye) or covert (i.e. not visible to the naked eye), or combinations of overt and covert.

The laminates, which come in a roll form on a web material, are preferably formed with the codes prior to use of the roll, for example by the laminate supplier, i.e. the laminate manufacturer or vendor.

One use for the code is to read the unique code and then store the code along with the cardholder information. The code and cardholder information can then be sent to a central processing site (central computer system). In the case of a government issued document, the central processing site can be a government operated site. If an outside processor is used for personalization of a government issued document, the central processing can be contracted out, or a service bureau can be used for personalization and the central processing can be retained by the government.

The codes can be stored in the personalization machine with the cardholder data until downloaded to the central processing site. The central processing site can perform additional processing of the codes. For example, the codes can be made available online via a secure site to allow merchants, government entities, etc. to access the codes online to allow a check to determine whether a particular code is valid, or whether a code was stolen, etc.

Another use for the code would be for authenticating the laminate. The codes on the laminates can be provided to the user of the laminate roll and stored in a database accessible by the personalization equipment. During personalization, the equipment reads the laminate code, and can check the code against the database to determine whether the code is proper. If the code is not proper, the equipment operator can be alerted to that fact, and suitable action taken.

In an embodiment, the coded laminates can be used with coded documents to further enhance security.

In addition, the code on the laminate and/or on the document can be used as part of an additional security feature once the document is issued to the user. The code on the laminate and/or on the document can be used to generate an additional security code that is used to provide post-issuance security.

DRAWINGS

DETAILED DESCRIPTION

Figure 1:
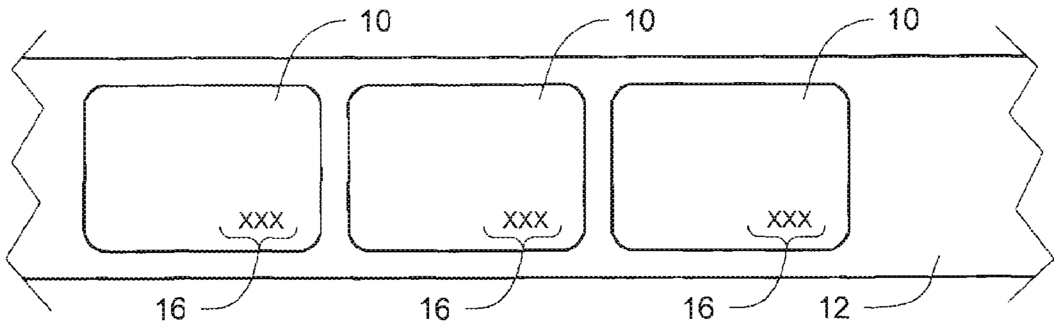
FIG. 1 illustrates a portion of a web containing serialized laminates.

FIG. 1 illustrates a plurality of laminates 10 that are disposed on a carrier web 12 of a type known in the art. The laminates 10 are made of a material, for example polyester, that renders the laminates generally clear or translucent to permit substantially unobstructed, unaltered viewing of an identification document to which it is ultimately laminated. An example of a suitable laminate is the DuraGard® clear laminate from DataCard Corporation of Minnetonka, Minn. The web 12 and laminates 10 are typically provided in roll form. Although the laminates 10 have been described as being clear laminates, the laminates 10 can be provided with overt or covert optically variable devices (OVD's), graphics, micro-printing, UV printing, etc.

The laminates 10 are intended to be laminated to a surface of an Identification document 14 to protect the document against degradation and wear. The identification document 14 can be any identification document in which it is desired to deter fraudulent production, theft and fraudulent use of such documents. Examples of identification documents include plastic and composite cards, for example identification cards, credit and debit cards, and the like, and passports. To facilitate the description, the identification documents 14 will hereinafter be described as being identification cards 14 or just cards.

The laminates 10 are illustrated as being discrete laminates spaced apart from one another on the web 12. However, the term laminate is intended to include any protective material, including material referred to as topcoat, which is intended to be permanently disposed on a surface of a card to protect the card. Thus the laminates could be provided in the form of continuous film where the laminates are not individualized patches.

Each laminate 10 is provided with a code 16, illustrated schematically by "xxx". The codes 16 provide a unique indicator for each respective laminate 10. The codes can be formed by any type of indicia, for example a barcode, numbers, letters, symbols, etc., and combinations thereof The code on each laminate can be overt (i.e. visible to the naked eye) or covert (i.e. not visible to the naked eye), or combinations of overt and covert. In the illustrated embodiment, the codes 16 are overt and are printed onto each laminate 10. The codes 16 are preferably pre-printed onto the laminates by the laminate supplier, i.e. by the laminate manufacturer or a vendor of the manufacturer, prior to being used in personalization equipment.

Figure 2:
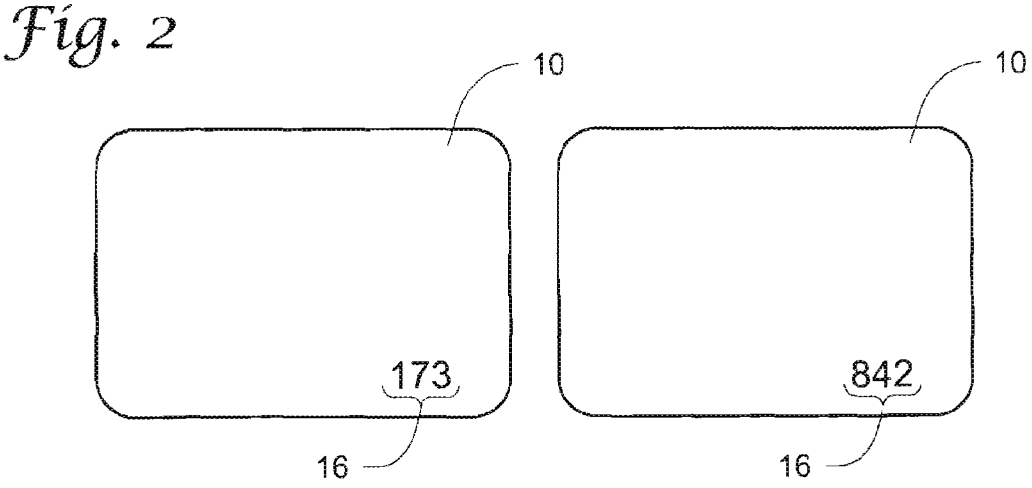
FIG. 2 depicts two laminates with exemplary codes.

FIG. 2 illustrates an example of codes 16 on laminates 10. The carrier web is not illustrated in FIG. 2 for simplicity. In this example, one code is the numbers 173 while the other code is numbers 842. The other laminates would each have their own unique code. In one embodiment, the codes 16 on the laminates can be sequential codes (e.g. 123, 124, 125, etc.) thereby indicating that the laminates 10 on the web are sequentially or serially arranged.

The unique code on each laminate can be read and then stored along with the cardholder information. The code and cardholder information can then be sent to a central processing site (central computer system). In the case of a government issued card, the central processing site can be a government operated site. If an outside processor is used for personalization of a government issued card, the central processing can be contracted out, or a service bureau can be used for personalization and the central processing can be retained by the government.

The codes can be stored in the personalization machine with the cardholder data until downloaded to the central processing site. The central processing site can perform additional processing of the codes. For example, the codes can be made available online via a secure site to allow merchants, government entities, etc. to access the codes online to allow a check to determine whether a particular code is valid, or whether a code was stolen, etc. In this manner, after issuance security is provided by permitting a check of a code on the laminate against a list of stored codes.

The codes 16 on the laminates 10 can also be provided to the user of the laminate roll by the laminate supplier, and can be stored in a database accessible by the personalization equipment. During personalization, the equipment reads each code, and checks the code against the database to determine whether the code is proper. By providing the laminate codes to the user and checking the codes against the database, theft or alteration of the laminates can be deterred.

The reading of the laminate codes can occur prior to attaching the laminate to the card, or after attachment. Preferably, the reading of the laminate code occurs prior to attaching the laminate to the card. The reading of the laminate codes is accomplished using conventional equipment known in the art. For example, if the codes are in barcode form, suitable bar code readers can be provided to read the barcodes. Cameras can be used to read printed numbers or letters. Optical character recognition can be used. However, it is preferred that machine readable codes be used.

Reading the code and checking the code against the database authenticates the laminate. However, the reading and checking can also be used as part of a decision whether to attach the laminate to the card. If the laminate is authentic, the laminate can be laminated to the card. If the code is not verified, the equipment operator can be alerted to that fact, and suitable action taken. For example, if the code is not contained in the database thereby indicating that the laminate may not be authentic, the laminate can nonetheless be laminated to its intended card 14, but the user can track the card through the equipment and remove the card, if necessary. Alternatively, the equipment can halt operation and notify the equipment operator of an improper laminate, and require the operator to make a decision on how to proceed. Other actions are possible.

The code 16 can also be used to generate an additional security code that is used to provide post-issuance security. For example, the code can be read and converted into a security code that is tied to the cardholder in a central, secure database. As the card is used, the database can be checked to match the cardholder data on the card and the security code to check for proper card use. This deters alteration of cards by removing the laminate, changing card data, and re-applying a new laminate.

The new code can be printed on the card during personalization and then the card would be laminated. This would provide a means for a simple visual check for card authenticity to determine that the correct laminate is on the card.

The additional code generated from the code 16 could be as simple as combining the code with another code, for example a code on the card, or a more complex code using an encryption algorithm.

Figure 3:
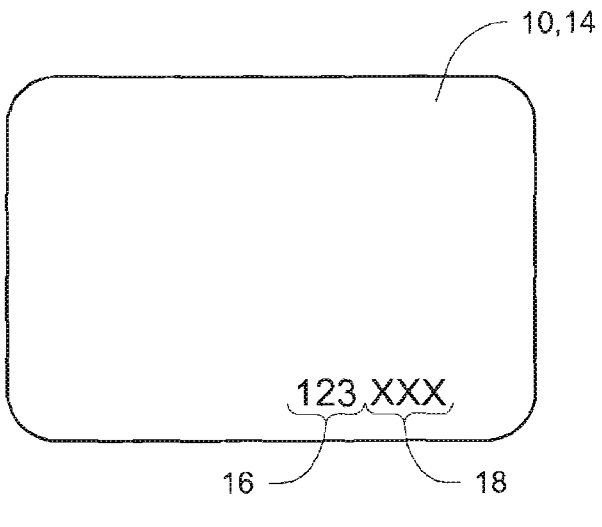
FIG. 3 depicts an identification card with a laminate applied thereto.

The coded laminates 10 can be used with the cards 14 that can also have unique codes to further enhance security. FIG. 3 shows an example of the card 14 provided with a code 18, illustrated schematically by "xxx". The code 18 can be formed by any type of indicia, for example a barcode, numbers, letters, symbols, etc., and combinations thereof. The code 18 on the card 14 can be overt (i.e. visible to the naked eye) or covert (i.e. not visible to the naked eye), or combinations of overt and covert. In the illustrated embodiment, the code 18 is overt and is printed onto the front surface of the card 14. Alternatively, the code can be provided on the rear surface of the card, or encoded on a magnetic stripe or an integrated circuit chip on the card.

The code 18 should indicate that the card is unique from other cards being personalized. In one embodiment, the code can be a sequential code to indicate that the cards are in sequential or serial arrangement.

The code 18 on the card 14 can be handled in a manner similar to the laminate code 16. The code 18 can be read and stored with the cardholder information and with the code 16 of the laminate 10 that is laminated to the card. The codes can then be made available online to permit checking of the codes after issuance to verify the card.

In addition, both the code on the laminate 10 and the code on the card 12 can be read during personalization, and checked against a database of stored codes to confirm that the laminate and card are proper. Thus, reading of both codes can act as an authentication measure. If the codes are authenticated, the authentication can act as authorization to attach the laminate to the card. If one or more of the codes are not authenticated, an error message can be generated warning the system operator of an improperly sequenced laminate or card, or other action can be taken.

FIG. 3 shows an example of a laminate 10 that has been laminated to a card 14. In this example, the code 16 on the laminate 10 and the code 18 on the card 14 are positioned such that when the laminate 10 is laminated to the card 14, the codes 16, 18 are aligned to generate the combined code 123xxx.

The concepts described herein can be used on central issuance personalization equipment, for example the MX6000 Card Issuance System available from DataCard Corporation of Minnetonka, Minn., or on desktop machines, for example the SP Series Card Printers available from DataCard Corporation of Minnetonka, Minn.

The invention may be embodied in other forms without departing from the spirit or novel characteristics thereof The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A laminate for a personalized identification document, comprising:

a protective material substrate that is intended to be permanently fixed to a surface of the personalized identification document, the protective material substrate being made of a material suitable to protect the personalized identification document against degradation and wear when the protective material substrate is fixed to the personalized identification document surface, and the material permitting viewing of information on the personalized identification document surface underneath the protective material substrate;

the protective material substrate including a readable, pre-verification unique indicator code not assigned to card data, the pre-verification unique indicator code is selected from the group consisting of letters, numbers, a bar code, and combinations thereof;

wherein the pre-verification unique indicator code verifies the laminate prior to attaching the protective material substrate to the personalized identification document.

2. The laminate of claim 1, wherein the material comprises polyester.

3. The laminate of claim 1, wherein the protective material substrate is substantially translucent.

4. The laminate of claim 1, wherein the protective material substrate includes one or more of an optically variable device, graphics, micro-printing, and ultraviolet printing.

5. The laminate of claim 1, wherein the laminate is provided on a carrier web prior to being fixed to the surface of the personalized identification document, and the laminate is a discrete member spaced apart from other laminates on the carrier web.

6. The laminate of claim 1, wherein the pre-verification unique indicator code is at least partially overt.

7. A supply item for use in laminating a personalized identification document, comprising:

a carrier web; and a laminate on the carrier web, the laminate comprising a protective material substrate that is intended to be permanently fixed to a surface of the personalized identification document, the protective material substrate being made of a material suitable to protect the personalized identification document against degradation and wear when the protective material substrate is fixed to the personalized identification document surface, and the material permitting viewing of information on the personalized identification document surface underneath the protective material substrate;

the protective material substrate including a readable, unique indicator code, the unique indicator code is selected from the group consisting of letters, numbers, a bar code, and combinations thereof.

8. The laminate of claim 7, wherein the material comprises polyester.

9. The laminate of claim 7, wherein the protective material substrate is substantially translucent.

10. The laminate of claim 7, wherein the protective material substrate includes one or more of an optically variable device, graphics, micro-printing, and ultraviolet printing.

11. The laminate of claim 7, wherein the laminate is a discrete member spaced apart from other laminates on the carrier web.

12. The laminate of claim 7, wherein the unique indicator code is at least partially overt.

13. A security process, comprising:

securing a laminate comprising a protective material substrate containing a unique indicator code placed by a laminate supplier onto a surface of a personalized identification document, the unique indicator code is selected from the group consisting of letters, numbers, a bar code, and combinations thereof; and reading the unique indicator code; wherein the personalized identification document includes a code on the document surface, and further comprising securing the protective material substrate to the document surface so that the unique indicator code of the protective material substrate and the code on the document form a combined code.

14. The security process of claim 13, further comprising storing the read unique indicator code along with information on an intended document holder.

15. The security process of claim 13, further comprising generating an additional code based on the read unique indicator code.

16. The security process of claim 13, further comprising comparing the read unique indicator code against a database of stored codes.

17. The security process of claim 13, further comprising reading the unique indicator code prior to securing the protective material substrate to the document surface.

18. A security process, comprising: reading a unique indicator code that is provided on a protective material substrate by the substrate supplier that is adhered to a surface of a personalized identification document; and accessing a database of stored codes as a part of a determination as to whether the read unique indicator code is included in the database of stored codes; wherein the personalized identification document includes a code on the document surface, and further comprising securing the protective material substrate to the document surface so that the unique indicator code of the material substrate and the code on the document form a combined code.

19. A method, comprising:

forming a readable, unique indicator code on a protective material substrate that is intended to be permanently fixed to a surface of a personalized identification document, the unique indicator code is selected from the group consisting of letters, numbers, a bar code, and combinations thereof, and the protective material substrate being made of a material suitable to protect the personalized identification document against degradation and wear when the protective material substrate is fixed to the document surface underneath the protective material substrate;

providing the protective material substrate to a consumer.

* * * * *